United States Patent Office 3,450,688
Patented June 17, 1969

3,450,688
PROCESS FOR ISOLATING PROTEINS FROM BEANS IN A CRYSTALLINE STATE USING AN ALKALI SALT OF A CARBOXYLIC ACID
Paul Melnychyn, 9826 Camino Real, Arcadia, Calif. 91006
No Drawing. Filed Sept. 7, 1965, Ser. No. 485,614
Int. Cl. C07g 7/022; A23j 1/14; C09j 3/18
U.S. Cl. 260—123.5            13 Claims

ABSTRACT OF THE DISCLOSURE

A method for isolating bean protein in preferably crystalline form and in high yield directly from beans, comprising the steps of mixing ground beans with a dilute aqueous solution of a salt of a mono-, di- or tri-carboxylic acid having a salt normality between about 0.1 and about 0.8 and an acid pH, separating undissolved materal from the resulting solution, allowing the solution to stand while preferably keeping the solution refrigerated until the protein preferably crystallizes out of the solution, and thereafter separating the crystalline protein from the solution.

---

This invention relates to and has among its objects the isolation of proteins from beans and the like. A particular object of the invention is the provision of novel procedures whereby one may readily isolate proteins in a crystalline state from beans and the like, particularly from lima beans, pinto beans, kidney beans, and white beans. Another object of the invention concerns the provision of such crystalline proteins as new compositions of matter. Further objects and advantages of the invention will be evident from the following description wherein parts and percentages are by weight unless otherwise specified.

It is well known that proteins constitute a valuable component in many animal and plant materials. The seeds of leguminous crops are known to contain substantial proportions of proteins and are relatively inexpensive sources of these useful compounds. It is often desired to extract the proteins from such seeds, thus to obtain the protein components in a condition substantially free from extraneous starch, sugars, cellulose, fat, wax, crude fiber, etc. Various procedures have been advocated to achieve such results. In one known procedure, the plant material is extracted with a dilute aqueous neutral salt solution. Varying concentration of ammonium sulphate may then be added to the extract to precipitate the protein. A prime disadvantage in this and similar techniques which involve a precipitation of the protein from solution lies in the very fact that precipitation forms an essential part of the procedure. Precipitates are notorious for their ability to occlude materials from the solution in which they are formed and protein precipitates are no exception to this rule. Indeed, because of their generally bulky and slimy or gummy nature they tend to occlude substantial proportions of materials present in the environment where they are formed. This occlusion phenomenon means, in a practical sense, that the precipitated protein is only a very crude product and requires considerable further treatment to attain a protein in purified form.

Other procedures often involve use of aqueous organic solvents to facilitate precipitation, and occasionally, crystallization of protein. However, these procedures usually involve several precipitations and solution before the protein crystallizes.

A primary advantage of the present invention is that the protein is not isolated from solution by any precipitation techniques but is isolated directly by crystallization. In the process of direct crystallization little if any occlusion takes place so that the protein isolated by the process of the invention is in a highly refined condition and may be used as such for many applications. The after-treatments required with the usual precipitation procedures are thus eliminated or minimized.

Another factor which contributes to the purity of the products of the invention is that they are crystallized from solutions containing very low concentrations of water-soluble salts (specifically salts of monocarboxylic, dicarboxylic and tricarboxylic acids). This means that the opportunity for contamination of the product with salts is reduced simply because there is not much of the salts in the environment. This situation is to be contrasted with certain prior techniques where proteins are precipitated from solutions containing high salt concentrations or are crystallized only after a series of precipitation and solution steps.

Another advantage of the invention stemming from the fact that crystalline proteins are obtained, is that the products may be of a substantially homogeneous nature, even though they may exist as complexes, and are thus completely different from the usual protein precipitates which include a variety of proteinaceous substances of differing chemical and/or physical properties.

A further advantage of the invention lies in the fact that the crystalline product can be readily separated from the solution in which it is formed.

An outstanding feature of the invention is that it yields a crystalline protein product with the application of a very simple and direct isolation procedure.

The products of the invention exhibit a crystalline structure and are white or essentially colorless. Their proteinaceous nature is evidenced by typical positive tests obtained with the biuret, Millon's, and xanthoproteic reagents. They are soluble in acid and in alkaline solutions. The products obtained from lima beans have a bi-pyramidal crystal habit. Proteins from other varieties of beans will also exhibit a bi-pyramidal crystal habit when crystallized from extracts of water-soluble salts of dicarboxylic and tricarboxylic acids whereas they may assume other forms if crystallized from water-soluble salts of monocarboxylic acids.

A sample of crystalline protein derived from lima beans in accordance with the invention was found to have a molecular weight of about 180,000 by light scattering measurements; about 100,000 to 120,000 by ultracentrifugal measurements; and gave the following analysis:

| Element: | Percent (dry basis) |
|---|---|
| C | 51.9 |
| H | 6.98 |
| O (by difference) | 25.46 |
| N | 14.8 |
| S | 0.18 |
| P | 0.55 |
| Ash | 0.13 |

Analysis of the protein further indicates the presence of a relatively high proportion of mannose—i.e. about 9 to 10% of the protein, by weight.

The products of the invention are useful as supplements for feeds and foods. Thus, they may be added to conventional feeds and foods to increase the nutritional value of these materials. Particularly significant in such uses is the degree of purity and homogeneity, as defined above, the proteins of the invention as evidenced by their crystalline nature. Use of the products of the invention is, however, not restricted to food applications and they may be employed in various industrial and pharmaceutical applications, for example, as binders and thickeners in such products as textile printing pastes, water-based paints, adhesives, sizes, paper coating compositions, in dietary supplements, and geriatric pharmaceutical applications and the like.

In essence, the process of the invention involves the extraction of beans with a dilute acidified aqueous solution of a water-soluble salt of preferably unsubstituted or hydroxy substituted aliphatic straight or branched chain mono-, di- and tri- carboxylic acid such as acetic, propionic, butyric, lactic, glycolic, glyoxylic, malonic, fumaric, succinic, glutaric, adipic, malic, tartaric, and citric.

In general, it has been found that the water-soluble salts of the di- and tri-carboxylic acids are much preferred over the same water soluble salts of the monocarboxylic acids because lower concentrations of these polybasic acids can be employed to effect the isolation and crystallization of protein. The resulting extract or solution is then allowed to stand, whereby the protein crystallizes out of solution. It is evident from this and the following description that the process of the invention is outstanding in its simplicity. Despite this simplicity, the process is highly effective and enables the isolation of crystalline protein in yields up to 35% of the total protein contained in the beans.

As the starting material for the process of the invention, one of many varieties of beans may be used. The several varieties of lima beans are botanically termed *Phaseolus lunatus*. The process is, however, not restricted to lima beans and may be applied to other types of beans. Typical examples of other types are varieties of *Phaseolus vulgaris*, for instance, kidney beans, large white beans, and pinto beans. The invention may also be applied to varieties of *Glycine soja*, that is, soybeans, but in this case the products may not be crystalline. Ordinarily, the beans to which the process is applied are the usual dry beans available in commerce. The products are often referred to as dry shell beans because the product includes only the mature seeds, the pods having been removed. As a preliminary step to enhance contact between the bean material and the extracting medium, the beans are ground in conventional apparatus to the form of a powder or flour. It is sometimes desirable to de-fat the beans prior to contact with the protein extracting medium. The de-fatting step can be conducted in known manner by extraction with suitable fat solvents.

As noted hereinabove, the extracting medium applied to the ground beans is a dilute aqueous solution of a water soluble salt of the desired acid. The pH of the extracting medium should be on the acid side, i.e., about 1.0 to 6.0. Usually excellent results are obtained with a pH of about 3.5 to 5.0 and this degree of acidity is preferred. A convenient way to prepare the extracting medium involves diluting the desired acid with water to the approximate desired normality, adjusting the pH to the selected level by addition of a suitable alkali, e.g. sodium hydroxide, and then adding more water to adjust the normality of the solution to the appropriate level desired for the extraction procedure.

In general, the concentration of the extracting medium may vary from about 0.05 to about 0.8 normal. A particular concentration within this range enables a high yield of crystalline protein to be obtained, and the particular concentration chosen depends upon the particular extracting medium and upon the type of bean to which the process is applied. For example, with lima beans, if one selects a solution containing a salt of acetic acid, it is preferable to use a 0.1 normal sodium acetate solution; with pinto beans or soy beans, 0.6 normal sodium acetate solution; with kidney beans, 0.6 to 0.8 normal sodium acetate solution; with large white beans, 0.4 to 0.8 normal sodium acetate solutions. If one selects a solution containing a salt of a dicarboxylic acid, such as fumaric acid, or a salt of a tricarboxylic acid, such as citric acid, in the extraction of protein from kidney beans, the extraction and crystallization may be effected with a solution which is 0.05 to 0.1 normal. This illustrates the greater effect of the polybasic acids, as previously mentioned.

Under some circumstances, it may be preferable to utilize an initially high concentration of a suitable salt of a specific acid and then dilute the extract with water to attain a normality of between about 0.05 to about 0.8 normal, and thereby induce the crystallization of protein. The specific concentration chosen is dependent upon the type of bean and extracting medium chosen, as aforementioned.

The concentration limits, for maximum protein yield, are quite critical in my process. It is found that much of the protein cannot be crystallized when the extracting medium lies above about 0.8 normal and this is so because the protein apparently remains in solution. At too low a concentration of extracting medium i.e. below about 0.05 normal, very little protein can be extracted because of its relatively low solubility in any of the extracting mediums heretofore mentioned.

In any particular instance, the normality of the extracting medium required for optimum results can be determined by the following test: Pilot samples of the beans to be processed are agitated with solutions, e.g. sodium acetate, of different normalities. The preparations are filtered or centrifuged to remove undissolved material and the clear extracts are allowed to stand and observed for indications of incipient crystallization, that is, appearance of cloudiness. The extract which displays earliest signs of cloudiness indicates that this extracting medium provides the best conditions and the main batch of beans is then treated with a sodium acetate solution of that normality.

As in any extraction procedure, it is necessary that there be intimate contact between the bean material and the extracting medium and this can be achieved, for example, by agitating the mixture and allowing it to stand for about a half-hour, or by agitating the mixture continuously or at intervals.

The extracting medium is used in such proportion, relative to the weight of beans, to ensure effective extraction of proteinous material from the beans. Generally, the amount of extracting medium is substantially in excess of the weight of beans. Ordinarily, it is preferred to use about 10 ml. of the extracting medium per gram of ground de-fatted bean.

Following the intimate contact between the ground bean material and the extracting medium, the mixture is filtered or centrifuged to separate the undissolved material. The resulting extract is then allowed to stand and the crystalline protein will be produced in it. The simplicity of the process of the invention is demonstrated by the fact that no addition of any reagent is required to achieve this crystallization—it occurs spontaneously. Usually, to increase the rate of crystallization and the total yield of crystalline protein, the extract is cooled—for example, held in an ordinary refrigerator at about 35 to 55° F. After the crystalline protein is formed it is separated from the mother liquor by filtration, decantation, or centrifugation and is ready for use. If it is desired to prepare a product which is entirely free of the minute amounts of foreign occluded protein which may be on the surface of the crystals, the product may be recrystallized. Subsequently, the recrystallized protein may be freed from traces of the water-soluble salt of the acid, if desired, by dialysis or washing with water.

The invention is further demonstrated by the following examples:

Example 1

A 0.1 normal acetic acid solution was adjusted to pH 4 by addition of sodium hydroxide. 100 ml. of this solution was mixed with powdered de-fatted lima beans, using 10 ml. of the acetate solution per gram of beans. The slurry was allowed to stand at room temperature for 30 minutes, then centrifuged. The supernatant solution (extract) was placed in a refrigerator (about 5° C.) for 24 hours to enhance crystallization of protein. The protein crystals were separated from the remaining liquid. Nitrogen analyses indicated that of the total amount of protein in the beans 27% was recovered as the crystalline product.

Example 2

20 gms. of ground or crushed pinto beans (non-defatted) were extracted for 0.5 hours with 200 mls. of 0.1 N sodium fumarate solution (pH 4.0) at elevated temperature (38° C.). The mother liquor was removed and the protein was permitted to crystallize under refrigeration. The protein was harvested after 12–18 hours. The nitrogen precipitated in crystalline form (protein) corresponded to 21% of the total protein originally present in the bean.

Example 3

Sodium fumate was used to prepare crystalline protein from lima beans (non-defatted) as in Example 2 using solutions of about 0.05 N (pH 3.6). The yield was about 25% of the total protein originally present in the bean.

Example 4

Sodium fumarate solution of 0.05 N (pH 3.6) was employed to prepare crystalline protein from un-defatted, ground kidney and large white beans, using a ratio of 1:10 (wt./vol.) of ground bean to extracting solvent as set forth in Example 2. The suspensions were agitated for about 30 minutes; and the aqueous phase was removed by filtration or centrifugation and refrigerated to facilitate the crystallization of protein. The estimated yield was about 25% of the total bean protein.

Example 5

200 ml. of a 0.1 N solution of sodium tartrate (pH 4.0) was employed to extract protein from 20 grams of un-defatted, ground lima beans in accordance with the procedure of Example 2. Insoluble residue was removed and protein crystallization was facilitated by refrigerating the clarified supernatant phase. The estimated yield of crystalline protein obtained was about 20% of the total originally present in the bean.

Example 6

The procedure of Example 2 was followed except that a 0.08 N solution of sodium tartrate was employed. The ratio of bean to extracting solvent remained the same. The yield of crystalline protein was improved over that obtained in Example 5 and approached 25%.

Example 7

The procedure of Example 2 was followed, but the protein was extracted from un-defatted, ground large white beans using 10 gms. of beans with 100 ml. of 0.1 N sodium tartrate (pH 4.0). A good yield of crystalline protein was obtained—estimated at about 25% of total in the bean.

Example 8

The procedure of Example 2 was employed using 0.08 N solution of sodium succinate (pH 4.0) to extract protein from un-defatted, ground lima beans. The best yields were produced when the extracting solution was maintained at about 0.08 N, the yield then obtained being about 25% of the total originally present in the bean.

Example 9

The procedure of Example 2 was followed except that a 0.05 N sodium citrate solution was used to extract protein from un-defatted lima beans. The yield was about 25% crystalline protein of that originally present in the bean.

Example 10

A 0.6 normal acetic acid solution was adjusted to pH 3.9 by addition of sodium hydroxide. 100 ml. of this solution was mixed with 10 grams of powdered de-fatted pinto beans. The slurry was allowed to stand at room temperature for one hour, then centrifuged. The supernatant solution was placed in a refrigerator (about 5° C.) for 24 hours to enhance crystallization of protein. The protein crystals were separated from the remaining liquid. Nitrogen analyses indicated that of the total amount of protein in the beans, 18.6% was recovered as the crystalline product.

Example 11

A 0.8 normal acetic acid solution was adjusted to pH 3.9 by addition of sodium hydroxide. This solution was mixed with powdered de-fatted kidney beans, using 10 ml. of the acetate solution per gram of beans. The slurry was allowed to stand at room temperature for one hour, then centrifuged. The supernatant solution was placed in a refrigerator (about 5° C.) for 24 hours to enhance crystallization of protein. The protein crystals were separated from the remaining liquid. Nitrogen analyses indicated that of the total amount of protein in the beans, 18.6% was recovered as the crystalline product.

Example 12

A 0.6 normal acetic acid solution was adjusted to pH 3.9 by addition of sodium hydroxide. This solution was mixed with powdered de-fatted kidney beans, using 10 ml. of the acetate solution per gram of beans. The slurry was allowed to stand at room temperature for one hour, then centrifuged. The supernatant solution was placed in a refrigerator (about 5° C.) for 24 hours to enhance crystallization of protein. The protein crystals were separated from the remaining liquid. Nitrogen analyses indicated that of the total amount of protein in the beans, 9.3% was recovered as the crystalline product.

Example 13

A 0.4 normal acetic acid solution was adjusted to pH 4.0 by addition of sodium hydroxide. This solution was mixed with powdered de-fatted large white beans, using 10 ml. of the acetate solution per gram of beans. The slurry was allowed to stand at room temperature for one hour, then centrifuged. The supernatant solution was placed in a refrigerator (about 5° C.) for 24 hours to enhance crystallization of protein. The protein crystals were separated from the remaining liquid. Nitrogen analyses indicated that of the total amount of protein in the beans, 10.7% was recovered as the crystalline product.

Example 14

A 0.6 normal solution of acetic acid was adjusted to pH 3.9 by addition of sodium hydroxide. This solution was mixed with powdered de-fatted large white beans, using 10 ml. of the acetate solution per gram of beans. The slurry was allowed to stand at room temperature for one hour, then centrifuged. The supernatant solution was placed in a refrigerator (about 5° C.) for 24 hours to enhance crystallization of protein. The protein crystals were separated from the remaining liquid. Nitrogen analyses indicated that of the total amount of protein in the beans, 31.3% was recovered as the crystalline product.

Example 15

Dry soy beans were ground, then extracted with ethyl ether to produce a de-fatted material. A 0.6 normal acetic acid solution was adjusted to pH 5.5 by addition of sodium hydroxide. This solution was mixed with the powdered soy beans, using 10 ml. acetate solution per gram of beans. The slurry was allowed to stand at room temperature for 3 hours with occasional agitation, then centrifuged. The supernatant solution was placed in a refrigerator (about 5° C.) for 24 hours to enhance precipitation of protein. The protein was separated from the remaining liquid. Nitrogen analyses indicated that of the total amount of protein in the beans, 20.9% was recovered as the product.

In all of the examples the ratio of bean to extracting solvent was 1:10 (weight/volume) but this is not critical. The yield of protein may be enhanced somewhat by re-extracting the insoluble residue with an additional fresh charge of extracting solvent, but most of the isolatable protein is removed in the first extract. This process could also be cyclized wherein, after removal of the crystalline protein, the pH of the mother liquor is adjusted by addition of the appropriate acid and reused to extract protein from a fresh charge of beans.

After the crystalline protein is harvested, some protein is still present in the supernatant solution. This protein can be induced to crystallize (at least in extracts from lima bean protein) by removal of soluble salts and sugars by some means such as dialysis.

I claim:

1. A method for isolating a protein in a crystalline state directly from beans which comprises mixing ground beans with a dilute, aqueous solution of a water-soluble salt of an acid selected from the group consisting of mono-, di-, and tri-carboxylic acids having a normality of about from 0.05 to about 0.8 and a pH from about 1.0 to about 6.0, separating the undissolved material from the solution, allowing the solution to stand while keeping it cool until protein crystallizes, and separating the crystalline protein from the solution.

2. The process of claim 1 wherein the beans are lima beans.

3. The process of claim 1 wherein the beans are pinto beans.

4. The process of claim 1 wherein the beans are large white beans.

5. The process of claim 1 wherein the beans are kidney beans.

6. The method of claim 1 wherein said solution is allowed to stand while keeping it at a temperature between about 35° F. and about 55° F.

7. A method for isolating a protein directly from beans which comprises mixing ground beans with a dilute solution of an alkali metal acetate having a normality of from about 0.1 to about 0.8 and a pH from about 3.5 to about 5.0, separating the undissolved material from the solution, allowing the dilute solution to stand while keeping it cool until protein precipitates, and separating the precipitated protein from the solution.

8. A method for directly isolating a protein in a crystalline state from beams, which comprises the steps of:

mixing ground beans with a dilute aqueous solution of a water-soluble salt of an acid selected from the group consisting of mono-, di- and tri-carboxylic acids having a normality sufficient to solubilize said protein and having a concentration sufficient to provide said dilute aqueous solution with a desired pH between about 1.0 and about 6.0;

diluting said dilute, aqueous solution with water to reduce said salt normality to at least a reduced normality below which said dilute aqueous solution is able to retain only minor amounts of said bean protein in solution, said reduced normality lying in the range between about 0.05 and about 0.8;

separating the undissolved material from said dilute aqueous solution;

allowing said dilute aqueous solution to stand until protein crystallizes; and separating the crystalline protein from said dilute aqueous solution.

9. The method of claim 8 wherein said salt normality is initially above about 0.8.

10. The method of claim 8 wherein said dilute aqueous solution is cooled while being allowed to stand.

11. The method of claim 10 wherein said dilute, aqueous solution is cooled to a temperature between about 35° F. and about 55° F.

12. A method for isolating bean protein in crystalline form, comprising the steps of:

mixing ground beans with a dilute, aqueous solution of an acid selected from the group consisting of mono-, di-, and tri-carboxylic acids having a normality between about 0.05 and about 0.8;

adding an alkali which forms a water-soluble salt with said acid to said dilute, aqueous solution to adjust the pH of said dilute aqueous solution to a desired pH between about 1.0 and about 6.0;

separating the undissolved material from said dilute aqueous solution;

allowing said dilute aqueous solution to stand until protein crystallizes; and separating the crystalline protein from said dilute aqueous solution.

13. The method of claim 12 wherein said dilute aqueous solution is cooled while being allowed to stand.

References Cited

UNITED STATES PATENTS

| | | | |
|---|---|---|---|
| 2,331,619 | 10/1943 | Morse | 260—123.5 |
| 2,415,426 | 2/1947 | Henning | 260—123.5 |
| 2,460,627 | 2/1949 | Erkko et al. | 260—123.5 |
| 2,712,539 | 7/1955 | Nugent et al. | 260—123.5 |

OTHER REFERENCES

Journal of American Chemical Society, 1898, vol. 20, pp. 410–418 (Osborne et al. I) and pp. 393–403 (Osborne II).

Journal of General Physiology, vol. 29, 1946, Kunitz (I), pp. 149–154, and pp. 291–293 and 305 (Kunitz II).

Encyclopedia Americana, pp. 377–379, 1964, vol. 3.

WILLIAM H. SHORT, *Primary Examiner.*

HOWARD SCHAIN, *Assistant Examiner.*

U.S. Cl. X.R.

99—17